UNITED STATES PATENT OFFICE.

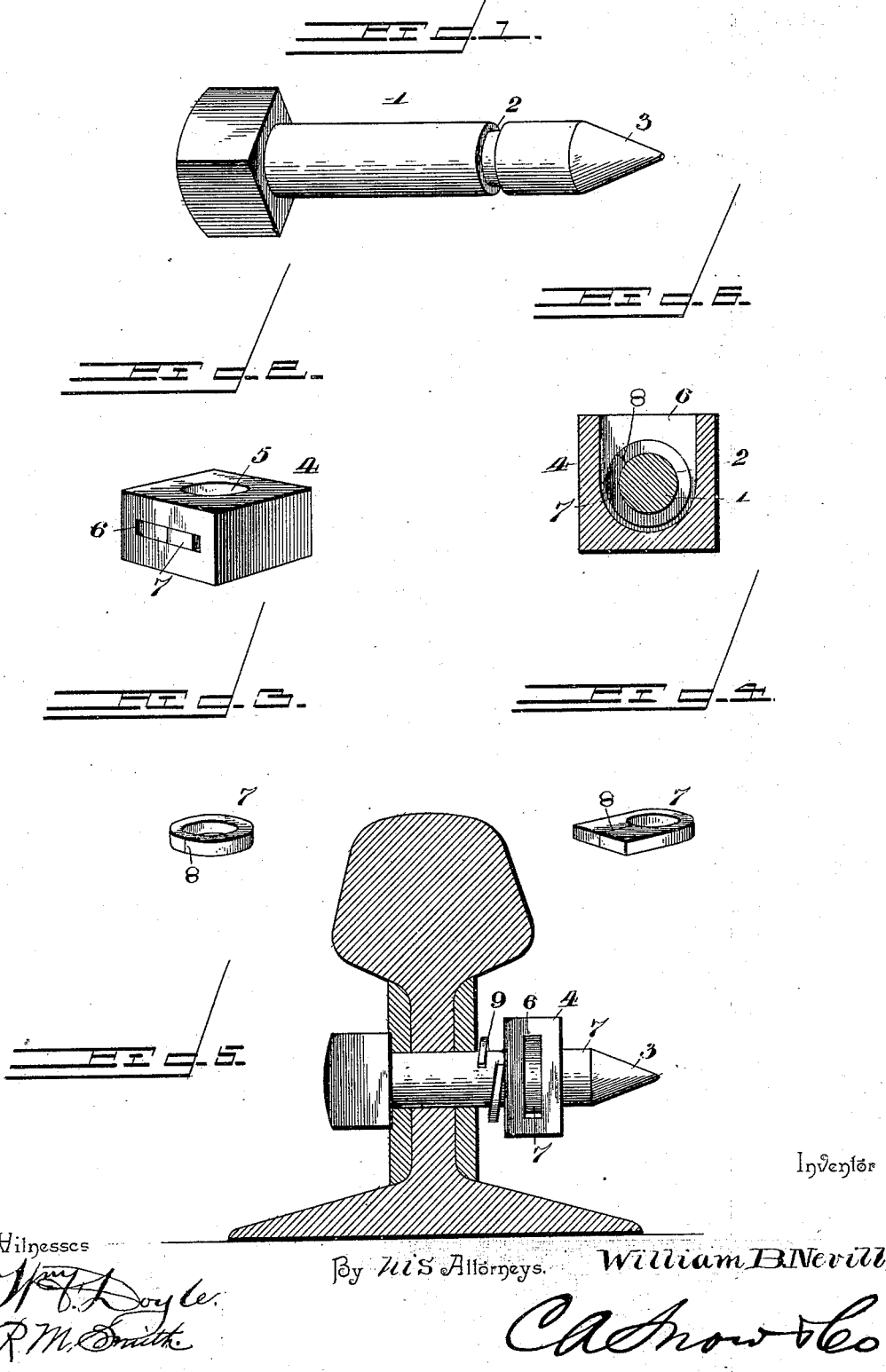

WILLIAM B. NEVILL, OF ROCKWALL, TEXAS, ASSIGNOR OF ONE-HALF TO E. W. HARDIN AND F. ECKERT, OF SAME PLACE.

BOLT AND NUT-LOCK.

SPECIFICATION forming part of Letters Patent No. 553,311, dated January 21, 1896.

Application filed April 12, 1895. Serial No. 545,523. (No model.)

*To all whom it may concern:*

Be it known that I, WILLIAM B. NEVILL, a citizen of the United States, residing at Rockwall, in the county of Rockwall and State of Texas, have invented a new and useful Bolt and Nut-Lock, of which the following is a specification.

This invention relates to an improvement in threadless bolts and nut-locks.

The object of the present invention is to provide a simple and inexpensive form of bolt and nut especially designed for use in connection with rail-joints or railway fish-plates, also car-trucks, locomotives, &c.

The object of the invention is to provide a nut-lock of such construction that it may be used either as a permanent nut-lock or one in which the locking feature may be thrown out of engagement when it is desired to remove the bolt for any purpose.

To this end the invention consists in certain novel features and details of construction and arrangement, as hereinafter fully described, illustrated in the drawings, and pointed out in the claims.

In the accompanying drawings, Figure 1 is a perspective view of an improved form of bolt having an annular groove and a tapering or pointed shank in accordance with the present invention. Fig. 2 is a similar view of the centrally-perforated nut, showing also a recess therein for the reception of the locking-spring. Fig. 3 is a similar view of a locking-spring intended for use as a permanent lock. Fig. 4 is a similar view of the temporary locking-spring adapted to be inserted into the recessed nut. Fig. 5 is a sectional view through a rail and a pair of railway fish-plates, showing the manner in which my improved locking device is utilized in practice. Fig. 6 is a horizontal section through a nut, showing the form of the recess therein for the locking-spring washer.

Similar numerals of reference indicate corresponding parts in the several figures of the drawings.

Referring to the drawings, 1 designates a bolt having a threadless shank, as indicated, and also provided with the usual polygonal head. At a suitable point the shank of the bolt is provided with an annular groove 2 and is also formed with a tapering or rounded point, as indicated at 3.

4 represents a nut which is provided with a central perforation 5 and also with a recess 6 opening out upon one side of the nut and extending inwardly far enough to intersect the central perforation 5.

The recess 6 is adapted to receive a locking device in the form of a spring-washer 7. The spring-washer 7 is substantially circular or annular and is split, as indicated, at 8 to adapt the same to be sprung open or the terminals of said washer to be forced apart by the tapered or pointed end of the threadless shank of the bolt, when the nut is forced upon said bolt.

In case it is desired to use the device as a permanent lock which cannot be manipulated for withdrawing the nut from its bolt, the form of spring-washer illustrated in Fig. 3 is employed. In case it is preferred to arrange the locking device so that it may be released from its engagement when desired, the form of spring-washer indicated in Fig. 4 is used, this washer differing only in that instead of being rounded upon its outer edge or periphery it is provided with a squared end adjacent to the split therein, as shown, said squared end being adapted to lie within and about flush with the mouth of the recess 6 in the nut, so that when it is desired to throw the spring-washer out of engagement with the annular groove in the threadless shank of the bolt it is necessary only to insert a pointed instrument between the terminals of said spring-washer and to pry the same apart, when it will be apparent that the bolt and nut may be withdrawn from engagement with each other.

The diameter of the hole or perforation in the spring-washer corresponds in size to the diameter of the bolt-shank within and at the base of the annular groove 2, so that when the spring-washer snaps into place within said groove it will fit snugly therein and engage the shoulders formed by said groove, thereby effectively preventing longitudinal movement of the nut upon the bolt. A spiral spring 9 is interposed between the inner face of the nut and the fish-plate or other article through which the bolt-shank passes. The object of this spring 9 is to fill up the space between the nut and said fish-plate and take up all slack, thereby preventing the nut and bolt from rattling and also serving to hold said nut and the spring-washer or lock in close contact. It will, of course, be understood that as the nut containing the spring-washer is forced onto the pointed or tapering end of the bolt-shank said tapering end will act upon the spring-washer in such manner as to force the terminals thereof apart for allowing the main body of the shank to pass through said washer until the annular groove 2 is brought into line with said washer, when the latter will automatically spring into place and engage said groove.

The device described is very simple and inexpensive in construction, is positive and reliable in operation, and while especially adapted for use in connection with rail-joints and railway fish-plates, car-trucks, locomotives, &c., it will be apparent that it may be used in numerous other places where a bolt of standard length and size is required. It will also be apparent that changes in the form, proportion and the minor details of construction may be resorted to without departing from the principle of sacrificing any of the advantages of the invention.

Having thus described my invention, what I claim is—

1. In a nut lock, the combination with a bolt having a threadless shank and provided with an annular groove, of a nut having a smooth central aperture adapted to receive said bolt shank, and also provided with a recess intersecting said central perforation, and a split spring washer inserted into the recess in said nut and adapted to engage the annular groove in the shank of the bolt, said washer being formed with a circular aperture, the diameter of which is less than that of the bolt shank, substantially as and for the purpose specified.

2. In a nut lock, a bolt having a threadless shank and provided with an annular groove and a tapering or rounded point, in combination with a nut having a central threadless perforation for the reception of said shank, a recess in said nut opening out at one side thereof and intersecting said central perforation, and a split spring washer located in said recess and adapted to engage said grooved shank, said split washer being provided with a squared end adjacent to the split therein for preventing the rotation of the spring washer relatively to the nut and enabling said spring washer to be manipulated for throwing it out of engagement with the groove in the shank of the bolt, substantially in the manner and for the purpose specified.

3. In a nut lock, a bolt having a threadless shank and provided with an annular groove and a tapering or rounded point, in combination with a nut having a central perforation and also provided with a recess intersecting said central perforation in the nut, a split spring washer located within said recess and adapted to engage the annular groove in the shank of the bolt, and a spiral spring surrounding said bolt shank and adapted to be interposed between the inner face of the nut and the fish plate or other device through which the shank of the bolt passes for taking up slack and preventing rattling and accidental displacement of the parts, substantially as set forth.

In testimony that I claim the foregoing as my own I have hereto affixed my signature in the presence of two witnesses.

WILLIAM B. NEVILL.

Witnesses:
E. S. BRIGHT,
A. R. HARTMAN.